(12) United States Patent
Rüger et al.

(10) Patent No.: US 11,609,089 B2
(45) Date of Patent: Mar. 21, 2023

(54) SYSTEM AND METHOD FOR ANALYSIS OF MEASUREMENT DATA ACQUIRED FROM MULTIPLE WORKPIECES

(71) Applicant: Carl Zeiss Industrielle Messtechnik GmbH, Oberkochen (DE)

(72) Inventors: Oliver Rüger, Dresden (DE); Daniel Görsch, Dresden (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 447 days.

(21) Appl. No.: 16/820,527

(22) Filed: Mar. 16, 2020

(65) Prior Publication Data
US 2020/0292309 A1    Sep. 17, 2020

(30) Foreign Application Priority Data
Mar. 14, 2019 (EP) .................. 19162769

(51) Int. Cl.
*G01B 21/04* (2006.01)
*G01B 21/20* (2006.01)

(52) U.S. Cl.
CPC ......... *G01B 21/045* (2013.01); *G01B 21/042* (2013.01); *G01B 21/20* (2013.01)

(58) Field of Classification Search
CPC ..... G01B 21/045; G01B 21/042; G01B 21/20
USPC ........................................... 702/95
See application file for complete search history.

(56) References Cited

U.S. PATENT DOCUMENTS

| 2011/0054835 A1 | 3/2011 | Takamasu et al. |
| 2017/0284785 A1* | 10/2017 | Somerville ............ G01B 5/008 |
| 2017/0363403 A1* | 12/2017 | Jonas ..................... G01B 5/012 |

FOREIGN PATENT DOCUMENTS

EP    1 679 486 A1    7/2006

OTHER PUBLICATIONS

Dana Efstate et al.; Correlation of CMM Data with Flexible Fixturing; SAE Technical Paper Series, vol. 1; Oct. 16, 2001; 8 pages.

* cited by examiner

*Primary Examiner* — Aditya S Bhat
(74) *Attorney, Agent, or Firm* — Miller Johnson

(57) ABSTRACT

A method for evaluating measurement data from a measurement of a plurality of workpieces includes obtaining a set of measurement data. Each workpiece has an associated set of measurement data. The set of measurement data corresponds to measurement points of the workpieces. The set of measurement data has, for each measurement point of the workpieces, at least one measured coordinate and/or, for each measured coordinate, a divergence from a comparison coordinate. The method includes determining a measure of the correlation of the measured coordinates and/or of the divergences is determined for a plurality of the sets of measurement data, in each case in relation to a pair of measurement points that consists of two measurement points of the workpieces.

14 Claims, 5 Drawing Sheets

SYSTEM AND METHOD FOR ANALYSIS OF MEASUREMENT DATA ACQUIRED FROM MULTIPLE WORKPIECES

CROSS-REFERENCE TO RELATED APPLICATIONS

This application claims priority to European Application No. 19 162 769.4 filed Mar. 14, 2019. The entire disclosure of the application referenced above is incorporated by reference.

FIELD

The invention relates to industrial metrology and more particularly to evaluating measurement data from a measurement of a plurality of workpieces.

BACKGROUND

In respect of production or other machining of workpieces, it is known practice to check the quality of the manufactured/machined workpieces. This can involve measurement of coordinates at predefined locations on the workpiece, e.g. in a coordinate system of the workpiece or of the measuring instrument. In this description text, the predefined locations are subsumed under the term "measurement point." Frequently, measurement points are prescribed on the basis of a specified shape and hence e.g. defined in a coordinate system of the specified shape. The specified shape can be defined by a CAD (computer-aided design) model, in particular. Measurement points can e.g. also each be defined on the basis of the actual workpiece to be measured, however. If the workpiece has a characteristic shape, the respective measurement point can be defined relative thereto. Examples of this are measurement points at the bottom of a hole or the ends of a raised region or projection.

At least one coordinate can be measured, i.e. its value can be ascertained, at the measurement point. If information about a specified shape is available, the measured coordinate can be compared with the corresponding coordinate of the specified shape, and e.g. the difference and/or divergence between the coordinates or, in the two-dimensional or three-dimensional case, alternatively or additionally the difference and/or divergence from the corresponding point of the specified shape can be ascertained.

It is possible to represent the divergences from the specified shape or from the expected value for a multiplicity of measurement points graphically. E.g. color coding allows a representation of whether and to what degree the measured value or set of measured values is concordant with or divergent from the specified value or the set of specified values.

Often, multiple workpieces of the same type or having comparable shape features are measured. If the workpieces are manufactured or machined in succession or at least in some cases at different times, then it is possible to refer to a history of the measurement data in regard to the applicable measurement data. In the general case of measurement of a plurality of workpieces, a set of measurement data is obtained for each of the workpieces and is therefore associated with the respective workpiece, the set of measurement data corresponding to a plurality of measurement points of the workpiece. Put another way, each set of measurement data contains measurement information pertaining to the different measured measurement points of the workpiece.

The sets of measurement data can each be structured and/or organized such that measurement information in the different sets belonging to mutually corresponding measurement points is identifiable and hence also comparable with one another. The set of measurement data for each workpiece therefore has at least one measured coordinate for each measurement point of the workpieces, and/or a divergence from a comparison coordinate for each measured coordinate.

In the aforementioned case of the color coding of divergences, an observer can e.g. see the color trend in accordance with the history of the measurement data and in this manner detect when or for which workpieces significant or unacceptable divergences have arisen. When there are a large number of measurement points, the color trend in accordance with the history of the manufacture/machining may need to be reproduced several times in the style of a running film in order to detect all significant divergences and possibly also detect interrelations between divergences at different measurement points.

SUMMARY

It is an object of the present invention to improve quality control for the manufacture and/or machining of a plurality of workpieces.

It is proposed that a correlation between the measured coordinate(s) and/or the divergence from a comparison value be determined for each of at least two measurement points, specifically over all workpieces under consideration. For each workpiece under consideration, consideration not being intended to be understood graphically, a set of measurement data of the type cited at the outset is available or is ascertained. From the sets of measurement data, it is therefore possible to process the associated measurement information for each of the at least two measurement points such that a measure of the correlation is obtained. The measure of the correlation therefore contains a quantitative statement about the degree of the interrelation and/or the dependency of the measurement information of the at least two measurement points over all workpieces under consideration. In the case of the history of the manufacture/machining of workpieces, a statement is therefore obtained about the interrelation over the entire period of the history. This statement can be used e.g. in addition to the above-described consideration of the result of a color coding in order to monitor the quality. It is thus not or not exclusively necessary to use the indirect route of a color-coded representation to ascertain whether errors during the manufacture/machining have substantially affected quality over the course of time. Since the determination of the measure of the correlation is performed each time in relation to at least two measurement points preferably automatically (e.g. using a data processing apparatus), a measure of the correlation can be determined for each of a multiplicity of combinations of measurement points. Automated evaluation of measurement points on a massive scale is therefore possible. This in turn allows e.g. an optical measuring sensor (such as e.g. a camera or scanner) to be used to measure a large number of measurement points for each of the workpieces, and then the resultant measurement data records to be evaluated. The quantification achieved for the evaluation by the determination of the measure of the correlation moreover allows a more accurate evaluation and/or more reliable determination of quality defects.

In particular, the following is proposed: a method for evaluating measurement data from a measurement of a plurality of workpieces, wherein each workpiece has an associated set of measurement data, wherein the set of measurement data corresponds to a plurality of measurement points of the workpieces, and the set of measurement data has, for each measurement point of the workpieces, at least one measured coordinate and/or, for each measured coordinate, a divergence from a comparison coordinate, and a measure of the correlation of the measured coordinates and/or of the divergences is determined for a plurality of the sets of measurement data, in each case in relation to a pair of measurement points that consists of two measurement points of the workpieces.

A measured coordinate means that a value of the coordinate is/has been determined during the measurement.

For each measurement point of the workpieces that has measurement data available in the set of measurement data that is associated with the workpiece, there thus exists a measured value for each coordinate of the measurement point and/or for each measured coordinate of the measurement point.

The workpieces can be workpieces that are comparable in respect of their geometry and in particular their specified geometry and therefore correspond to one another. This is the case in particular if at least one subregion of the plurality of workpieces has the same specified shape. Some or all of the measurement points to which the sets of measurement data correspond can thus lie in the subregion of the workpieces that has the same specified shape. If not just a subregion of the workpieces has the same specified shape, but rather the workpieces as a whole have the same specified shape, then, for each of the measurement points of a workpiece, there is a corresponding measurement point of each of the other workpieces that has the same specified coordinate(s). The specified shape can be defined by one or more coordinates. Thus, in particular for each of the plurality of measurement points for which the set of measurement data for a workpiece contains measurement information, each other set of measurement data that is taken into consideration for determining the measure of the correlation can contain corresponding measurement information associated with a measurement point having the same specified coordinate or the same specified coordinates. The measurement information is the at least one measured coordinate and/or the divergences(s) for the measured coordinate(s).

In particular, prior to the determination of the measure of the correlation, measurement information pertaining to measurement points for which there are no geometrically comparable measurement points in all sets can be removed from the sets of measurement data. However, measurement points are geometrically comparable not only if they are associated with the same specified coordinate or with the same specified coordinates, as is explained more precisely below. In particular, in the case of geometrically comparable measurement points of different workpieces, the connection between the measurement points can be made or exist by virtue of a common coordinate system or mutually corresponding coordinate systems. For example, in the case of workpieces having the same or partly the same specified shape, a coordinate system can be defined for each of the workpieces, which coordinate system can be the coordinate system of the specified shape, in particular. However, it is also possible for the common coordinate system to be a coordinate system of the measuring instrument for measuring the measurement points and/or a coordinate system of the machining installation for machining the workpieces. If a prescribed type of machining of the workpiece is always performed at the same location in such a coordinate system (examples will be cited below), then the points in the machining region for the different workpieces are comparable with one another.

In particular if the workpieces are geometrically comparable, then the measurement points of the different workpieces can be associated with one another and in particular have the same comparison coordinate (if one coordinate of the measurement point is/has been measured) or the same comparison coordinates (if a plurality of coordinates of the measurement point are/have been measured). The comparison coordinate(s) is/are in particular a coordinate or coordinates of the specified shape.

However, it is also possible to evaluate sets of measurement data from workpieces for a correlation if the workpieces do not necessarily have the same specified shape in at least one subregion. E.g. machining can take place on different types of workpieces with regard to a common coordinate system (e.g. the coordinate system of a production installation). As such, e.g. a hole of the same type can be made, a deformation of the same type can be performed or a material region of the same size can be applied at different locations on the different workpieces. The measurement points of the different workpieces at the machining positions are therefore nevertheless related to one another for geometric reasons (i.e. correspond to one another geometrically) and there is the possibility of usefully determining a measure of a correlation of the measured coordinates and/or of the divergences of the plurality of workpieces by evaluation of the applicable plurality of sets of measurement data.

It is thus preferred for the measurement points in the different sets of measurement data, which are regarded as comparable with one another and/or corresponding to one another for the purposes of determining a correlation, to be geometrically related to another, as described previously, for example.

In general, a relationship between measurement points of different workpieces can also exist for reasons other than geometric ones, however, and thus the determination of the measure of the correlation for at least one pair of measurement points can be useful. The relationship can be e.g. of logical type. By way of example, the order of the measurement of measurement points of the respective workpiece can stipulate the order of the measurement data in the set of measurement data that is associated with the workpiece. For example, the first measurement point in each of the data records would then be the first-measured measurement point of the workpiece. The second measurement point in each of the data records could then be the second measured measurement point of the workpiece, etc. From the correlation of a pair of measurement points, it is then possible to make a statement about the influence of the order of the measurement.

As explained above, the determination of the measure of the correlation relates to a plurality of the sets of measurement data and hence a plurality of workpieces, since each workpiece has an associated set of measurement data. Fundamentally, a correlation can already be determined for two sets of measurement data and hence two workpieces. In practice, however, it is advantageous to evaluate the sets of measurement data for a larger number of workpieces in respect of their correlation. The correlation, which relates in each case to a pair of measurement points, as explained above, therefore makes a statement with regard to the pair of measurement points in each set of the plurality of sets of measurement data. If e.g. the measured coordinates at the measurement points of the pair of measurement points in each set of measurement data diverge from a common comparison value in the same manner or if the measured coordinates in each set of measurement data are the same, the correlation is at a maximum (e.g. 1). If, on the other hand, the divergences or the measured coordinates of the pair of measurement points in the sets of measurement data vary, the correlation is correspondingly smaller. The divergences or measured coordinates may also be anti-correlated. This would be the case e.g. if an increase in the divergence from the comparison coordinate for one measurement point of the pair correlates with a decrease in the divergence from the comparison coordinate for the other measurement point of the pair.

In particular, the measure of the correlation can have a correlation coefficient. The measure of the correlation can be a measure of the degree of the linear interrelation between the measurement information of the mutually corresponding measurement points in the plurality of sets of measurement data. E.g. it can be a Pearson correlation coefficient. A measure of the correlation can alternatively or additionally be determined as a measure of a non-linear correlation, however. By way of example, a rank correlation coefficient can be determined, e.g. according to Spearman or according to Kendall. In particular, the measure specified for the correlation can thus be numerical values, e.g. according to Pearson in the range from −1 to +1, or values of the rank correlation coefficient. Other types of determination of the measure of the correlation are not excluded.

In particular, the measure of the correlation can be determined for each of a plurality of pairs of measurement points, and measurement points that are part of a pair of measurement points whose measure of the correlation satisfies a prescribed selection condition can be associated with one another. In particular, the mutually associated measurement points can be referenced to at least one of workpieces or to a specified shape of the workpieces.

The measure of the correlation is therefore used to make an association between a plurality of measurement points. The prescribed condition could be in particular that the measure of the correlation is in a prescribed range of values or a range of values explicitly ascertainable on the basis of a preset. In this way, the measurement points from pairs of measurement points correlated with one another in the same or a similar manner can be associated with one another. This allows for example highly intercorrelated or anti-correlated measurement points to be identified. Optionally, it is additionally possible to identify correlated pairs of measurement points in approximately the same manner (i.e. to approximately the same degree). In these cases, knowledge can be inferred from the identified measurement points, said knowledge being able to be taken into consideration to alter a process of machining and/or measuring additional workpieces. E.g. it is possible to infer from highly correlated measurement points that there is a systematic interrelation in the machining for the two measurement points (for example if the divergence from a specified coordinate is large). By way of example, in the event of a large divergence from the specified coordinate, a correlation between a first measurement point at the edge of a hole and a second measurement point at a curvature in a planar (according to the nominal preset) surface region at a distance from the hole can be used to conclude that the hole leads to a deformation in the region of the second measurement point. Alternatively, in some cases, it can be expected for example that divergences between measured coordinates and the specified shape correlate with one another in a specific local region. If this is not the case, i.e. if pairs of measurement points in this local region do not correlate with one another or correlate with one another slightly, this can be an indication of unexpected errors during the machining of the workpieces. If for example measurement points in the region of a hole are not correlated with one another as expected, this can indicate e.g. a defect in the drill used. Triggered by the aforementioned indication of errors, the machining tool and/or machining method used can then be examined more precisely.

In particular, measurement points can be associated with one another by virtue of a cluster of measurement points being formed, wherein a first measurement point is first of all selected or ascertained for the cluster and then further measurement points are associated with the cluster by checking whether the respective measure of the correlation of a pair of measurement points that consists of the potential further measurement point and the first measurement point satisfies an inclusion condition for including the potential further measurement point in the cluster. The first measurement point can also be referred to as a "center" of the cluster, the position of the center generally not coinciding with the center of gravity or center of mass of all points of the cluster. Preferably, such a center can be ascertained by virtue of a check being performed for each measurement point or at least for a plurality of measurement points to determine how many other measurement points satisfy the inclusion condition. The center selected can then be in particular the measurement point for which most other measurement points satisfy the inclusion condition. It is also possible for multiple centers to be selected and in this way for multiple clusters of measurement points to be formed. For example, the multiple centers can be the measurement points for which most other measurement points satisfy the inclusion condition each time. Preferably, after a first cluster is formed, all points of the cluster are no longer considered for the formation of further clusters. Alternatively, it is possible for just the center of the already formed cluster to no longer be considered for the formation of further clusters. This allows in particular members of the already formed cluster itself to be a center of a further cluster again. For example, a smallest possible number of cluster centers can be selected that lead to as large as possible a number of measurement points in the clusters overall for a prescribed inclusion condition.

The inclusion condition can be for example that the measure of the correlation is at least equal or (in another case) at most equal to a prescribed threshold value.

All measurement points of a cluster that are not the center are correlated with the center of the cluster in a similar manner. This allows conclusions to be drawn depending on the local distribution of the measurement points of the cluster, depending on the distances between the measurement points and depending on the type and range of values of the measures of the correlation, which conclusions will be discussed in more detail.

Generally, the object for the formation of the clusters can be defined as follows: find a smallest possible number of cluster centers that break down a largest possible number of measurement points into clusters.

In particular, at least one cluster can be represented graphically, wherein (e.g. straight and/or curved) connecting lines from a plurality of the further measurement points of the cluster to the first measurement point (the center) are represented together with a representation or partial representation of one of the workpieces or of a specified shape of the workpieces.

Alternatively or additionally, at least one cluster can be represented graphically, wherein a contour line is produced around all cluster points of the cluster and the region inside the contour line is represented in a color associated with the cluster. In particular when there are a multiplicity of cluster points, as occur in the case of measurements by optical sensors, such a color representation of a cluster is clearer. As an alternative or in addition to the color representation of the region inside the contour line, the contour line itself can be represented. A representation without a contour line is also possible, however.

Preferably, the representation takes place on at least one screen or a display. Such a representation allows an observer to grasp the interrelations provided on the basis of the correlation quickly and clearly.

Not only after formation of at least one association of measurement points, as described above, for example the formation of one or more clusters, is it possible for a test schedule to be created or altered taking into consideration the determined measures of the correlation. The test schedule is a schedule that has measurement points to be measured for the measurement of additional workpieces. Optionally, further information can be taken into consideration when creating or altering the test schedule, in particular the distance between the measurement points of the respective pair of measurement points. If for example measurement points of a pair are highly correlated with one another and satisfy a prescribed criterion for the distance, in particular do not exceed a prescribed threshold value for the distance, then one of the measurement points of the pair can be excluded from the test schedule or not included in the test schedule. In particular if a cluster of measurement points has been formed, the center of the cluster can be retained in the test schedule or included in the test schedule, but other measurement points of the cluster can be excluded or not included.

Not only in the case of the formation of an association of measurement points is it possible for a distance of the measurement points of the pair from one another to be ascertained for each of a plurality of the pairs of measurement points. The additional consideration of the distance of the measurement points of the pair improves the options for taking into consideration the determined correlation. Whereas for example measurement points at a short distance have a high probability of having a high level of correlation, at least in the case of workpieces having the same specified shape, high correlations are particularly conspicuous in the case of measurement points at a great distance. It is thus possible to look, in particular to look automatically (for example using the data processing computer that was also used to determine the measures of the correlation), for pairs of measurement points that are also at a great distance in the case of a high measure of the correlation, for example. By way of example, a threshold value for the distance is prescribed and a threshold value for the measure of the correlation. If both the distance between a pair of measurement points is above the threshold value for the distance and the measure of the correlation is above its threshold value, the pair is conspicuous and can be output automatically, for example. Alternatively or additionally, a graphical representation can take place, which will be discussed in more detail.

In particular, the distance between the measurement points can be defined in a coordinate system in which the specified shape of the workpieces is specified. What matters is therefore not the actual distance between the measurement points of a manufactured workpiece but rather the distance for the specified shape. The applicable model of the specified shape can also be referred to as nominal model. Alternatively or additionally, the distance can be for example the direct distance in three-dimensional space or the distance along the surface of the workpiece or the specified shape. In the latter case, measurement points situated on opposite sides of a workpiece can thus be at a greater distance than in the case of the direct distance in three-dimensional space.

In particular a formed cluster or multiple formed clusters can be used to determine a defect in a plurality of workpieces having the same specified shape, e.g. if a divergence from the specified shape is systematically produced during production of the workpieces. In this case, all measurement points in the region diverging from the specified shape are highly correlated with one another. In particular if the measurement data for each measurement point have a divergence from a comparison coordinate, the highly correlated divergences of the pairs of measurement points, which moreover in particular form a cluster, are easy to see. The evaluation of the ascertained measures of the correlation thus allows statements to be made about a machining process and optionally also allows the machining process to be modified.

If a distance of the measurement points of the pair from one another is or has been ascertained for each of a plurality of the pairs of measurement points, the determined measure of the correlation can be represented graphically, for example at least on a screen or a display, for the plurality of pairs of measurement points on the basis of the ascertained distance between the measurement points of the pair. This facilitates the evaluation of the determined correlations. For example, the representation can be used to detect which pairs of measurement points at a great distance also have a large measure of the correlation. The graphical representation can have a graph, for example a graph in which the distance is plotted along a horizontal axis and the measure of the correlation is plotted along a vertical axis.

In particular, the method is carried out using at least one data processing computer. Suitable computers are commercially available computers such as servers, notebooks, laptops, desktops, but also specifically configured computing units having integrated circuits such as graphics processors, DSPs (digital signal processors), microcontrollers, ASICs (application-specific integrated circuits), ASSPs (application-specific standard products) and/or FPGAs (field programmable gate arrays). It is also possible for a network comprising multiple instances of said computers to be used to determine the correlation. The same types of computers can be used in the network, or different types. The measurement data can be stored in computer-readable form in at least one data memory, so that the at least one computer can determine the measures of the correlation by accessing the data memory. This can be accomplished by using at least one permanent data memory and/or one main memory, for example.

The scope of the invention thus also includes an apparatus for evaluating measurement data that is in particular configured to perform one of the configurations of the method according to the invention. The apparatus has the at least one data processing computer, which is configured to determine the measure of the correlation for each of a plurality of the sets of measurement data. The data processing computer can have a data processor or an arrangement of data processors that is configured to perform one of the configurations of the method according to the invention.

Further, the scope of the invention includes a computer program and a computer-readable storage medium. The computer program comprises instructions that, upon execution of the program by a computer or by a computer network, prompt the latter to carry out one of the configurations of the method according to the present invention. The computer-readable storage medium comprises instructions that, upon execution of the program by a computer or by a computer network, prompt the latter to carry out one of the configurations of the method according to the present invention.

The description of the figures that follows describes an example embodiment of the measurement of workpieces. In the example element, a coordinate measuring instrument of gantry design is used that has an optical sensor arranged on it in order to measure a respective workpiece. However, the invention is not restricted to this type of coordinate measuring instrument and also not restricted to this type of sensor. However, the use of an optical sensor for the measurement of the workpieces is preferred, since optical sensors are capable of measuring a multiplicity of measurement points in a short time, or of capturing the measurement information suitable for determining the coordinates of the measurement points in a short time. In any case, the measurement of the workpieces can be performed for example in step with the mass production or mass machining of workpieces or for a selection of the workpieces manufactured during mass production or mass machining. This type of measurement is also referred to as in-line measurement.

In particular, for example an optical sensor or a plurality of optical sensors can initially be used to measure the plurality of workpieces, and the measures of the correlation can be determined for a plurality of the sets of measurement data. It is then possible, for example, as mentioned above, for a test schedule for the measurement of further workpieces to be created or modified. Alternatively or additionally, the determined measures of the correlation can be used in another way in order to prepare the measurement of further workpieces. This measurement of further workpieces can then be performed using a different measuring sensor or different measuring sensors than previously. For example, in comparison with the previously performed measurement of the plurality of workpieces to determine the correlation, a tactile sensor can be used following the evaluation of the correlation when there are a reduced number of measurement points. In particular, the measurement of the workpieces can thus involve at least one first measuring sensor with a first measurement accuracy being used to determine the correlation and, after the correlation has been determined and the correlation has been taken into consideration, a second sensor with a second measurement accuracy being used for the further measurement. The second measurement accuracy can be greater than the first measurement accuracy. Ultimately, this configuration thus results in a reduced number of measurement points being obtained by taking into consideration the determined measures of the correlation, and these measurement points then being able to be measured with greater accuracy.

BRIEF DESCRIPTION OF THE DRAWINGS

Example embodiments of the invention will now be described with reference to the accompanying drawing. In the individual figures of the drawing.

DETAILED DESCRIPTION

Figure 1:
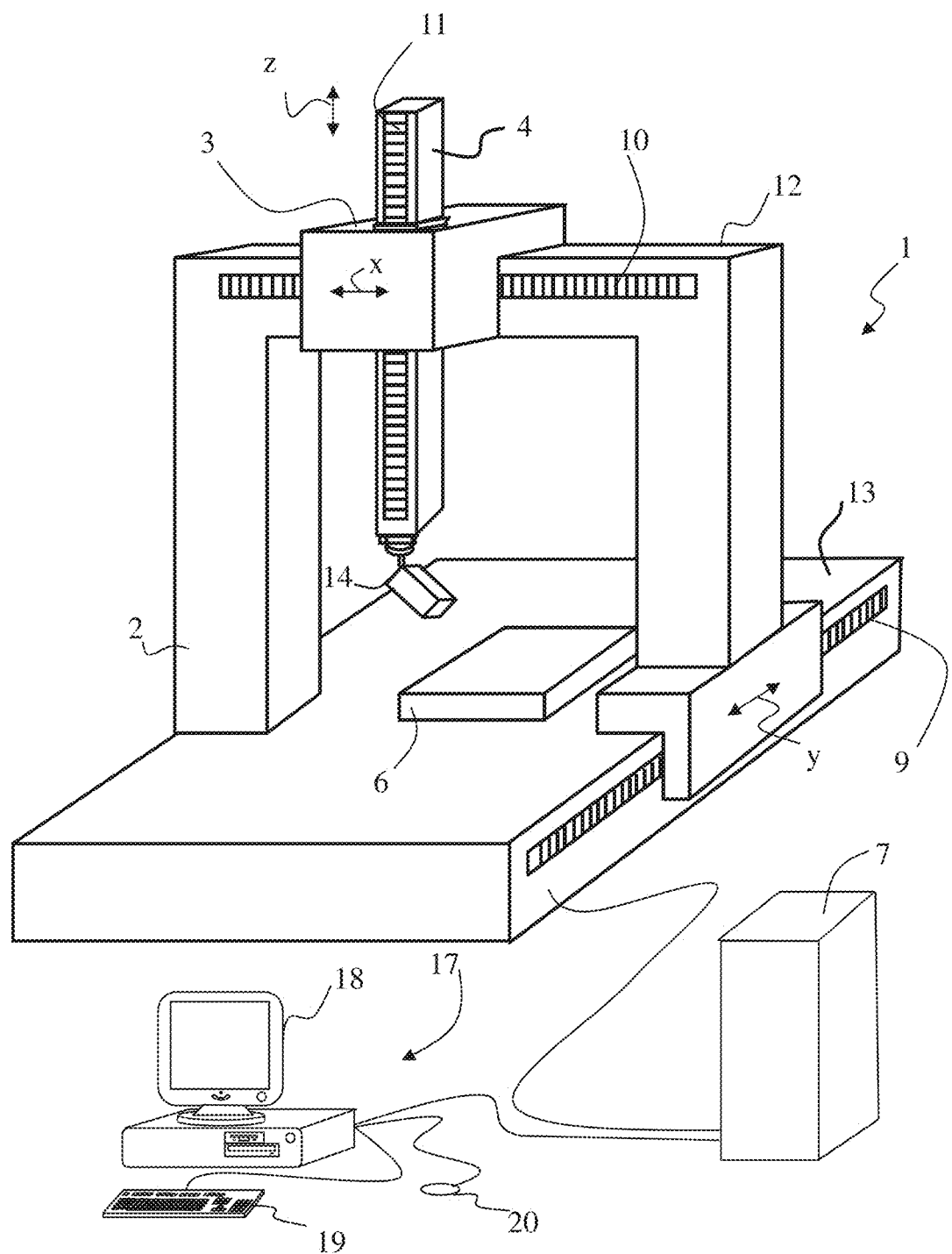
FIG. 1 schematically shows a coordinate measuring instrument having an optical measuring sensor whose measurement area has a workpiece arranged it, wherein the arrangement additionally schematically shows a computer connected to the coordinate measuring instrument.

FIG. 1 shows a coordinate measuring instrument 1 of gantry design. A base 13 of the coordinate measuring instrument 1 has a workpiece 6 arranged on it, which is measured using an optical sensor 14, e.g. a camera. Owing to the gantry design, the optical sensor 14 is mobile relative to the workpiece 6. The gantry 2 of the coordinate measuring instrument 1 is linearly mobile in a first direction denoted by y. The position of the gantry 2 can be ascertained in the y-direction e.g. by using a scale 9. A carriage 3 is linearly movable on the crossmember 12 of the gantry 2 in a direction denoted by x. The position of the carriage 3 relative to the gantry 2 can be determined e.g. on the basis of a scale 10. A spindle sleeve 4 is in turn arranged on the carriage 3 so as to be linearly mobile in a direction denoted by z. The optical sensor 14 is arranged at the lower end of the spindle sleeve 4, preferably so as to be mobile relative to the spindle sleeve 4 about at least one axis of rotation. The vertical position of the spindle sleeve 4 and of the sensor 14 can be ascertained e.g. on the basis of a scale 11 along the spindle sleeve 4. The directions x, y and z form a Cartesian coordinate system.

As represented schematically at the bottom right of FIG. 1, there is provision for a control 7 of the coordinate measuring instrument 1, which controls the measurement of the workpiece 6 or of other workpieces and receives and optionally records the measurement data from the optical sensor 14. Alternatively, the measurement data can be forwarded from the control 7 directly to a computer 17 represented schematically at the bottom left of FIG. 1. The computer 17 is equipped with a screen 18 and at least one keyboard 19 and also optionally with further operator control devices such as a computer mouse 20. As will be explained in more detail on the basis of an example embodiment, the computer 17 can be configured to e.g. use appropriately configured software (e.g. at least one computer program) executed on it to evaluate measurement data records from the measurement of multiple workpieces by the coordinate measuring device 1. A measure of the correlation across all measurement data records can be determined for each of pairs of measurement points, in particular. The embodiment with a computer that is described on the basis of FIG. 1 is merely an example. In practice, instead of a local personal computer, for example a computer server can be used, to which multiple local computers have access via a computer network. Alternatively or additionally, a handheld computer, such as for example a smart phone and/or a tablet computer, can be used to evaluate the measurement data records.

In particular, the measurement data records have a plurality of pieces of measurement information in the style of a row vector or column vector. Each piece of measurement information forms an element of the vector and is the result of the measurement of a single measurement point of the workpiece with which the measurement data record is associated. The measurement information of the different measurement data records is structured in the same way, organized, or can be accessed, such that the measurement information assigned for the mutually corresponding measurement points of the different workpieces is ascertainable and/or usable to evaluate the measurement data records. In this way, the measurement information contained in the measurement data records can be loaded for each of the mutually corresponding measurement points of the different workpieces and is available together with each of the pieces of measurement information of other measurement points for determining a measure of the correlation. The measurement information of all measurement data records can therefore be represented e.g. mathematically in matrix form, as the following matrix shows:

$$\begin{array}{c|cccc} & M1 & M2 & & Mk \\ C1 & 0.2 & 0.6 & \ldots & 0.5 \\ C2 & 0.4 & 1.3 & \ldots & 1.0 \\ \ldots & & & & \\ Cn & 0.7 & 0.8 & \ldots & 0.3 \end{array}$$

The matrix is a matrix having n rows and k columns. In this case, k is the number of measurement data records M and n is the number of measurement points and hence also of measurement information C in each measurement data record M. The measurement data records M are thus denoted by an index from 1 to k and the measurement information C is denoted by an index from 1 to n. The numerical values in the matrix reproduced above serve merely as examples. They can have other values and can each also have more than one value, e.g. if there is more than one coordinate or one coordinate divergence per piece of measurement information.

In particular if a measure of the correlation over all measurement data records M has been determined for each pair of measurement points C contained in the represented matrix above, the correlations can be represented as in the correlation matrix below, for example. In the case of a data processing by computer, applicable mathematical representations can be implemented for the data processing. The correlation matrix below does not just relate to the specific case in which only one coordinate is considered per piece of measurement information and the measurement information thus contains either the measured value of the coordinate or a divergence from a comparison value. A correlation can instead be specified even if multiple coordinates or divergences per measurement point are considered.

$$\begin{array}{c|cccc} & C1 & C2 & & Cn \\ C1 & 1.0 & 0.9 & \ldots & 0.1 \\ C2 & & 1.0 & \ldots & -0.05 \\ \ldots & & & & \\ Cn & & & \ldots & 1.0 \end{array}$$

Since the correlation matrix also contains the correlation of the measurement points C with themselves, the value "1,0" is entered on the diagonal of the matrix in each case. The determined measures of the correlation are entered on the right above the diagonal. This is thus a triangular matrix. As the three measures of the correlation that are entered by way of example show, both positive and negative correlation measures can arise. In the example, this is the Pearson correlation, which is presented by a correlation coefficient that can range from the value −1 to the value +1. Any other form of representation or description of the measurement data records and of the correlation measures is possible.

Figure 9:
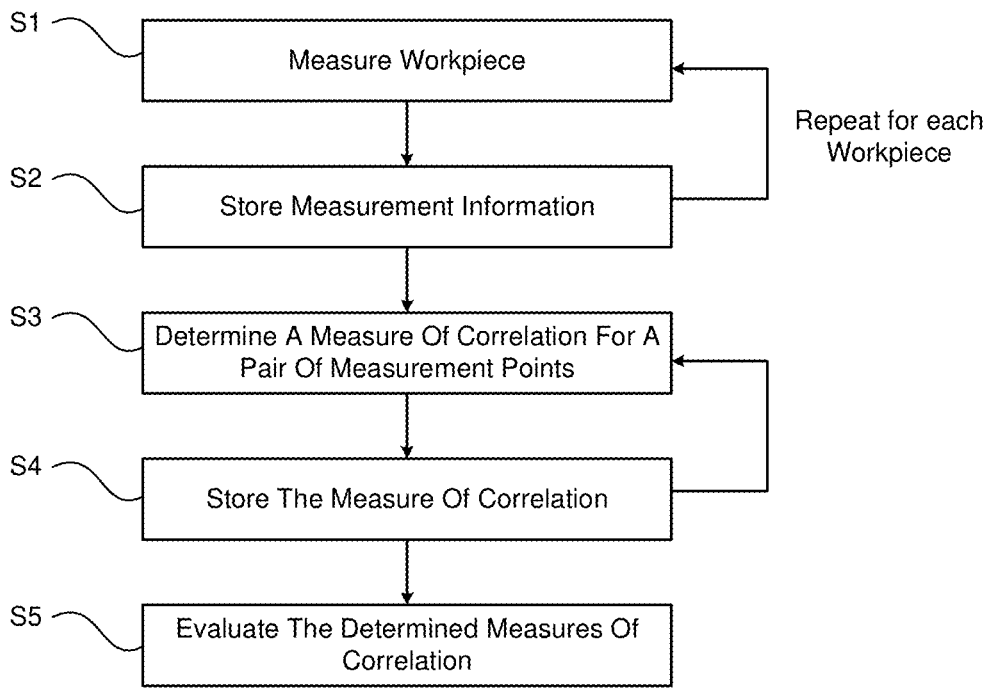
FIG. 9 is a flowchart to represent an example embodiment of the method according to the invention in which a measure of the correlation is determined for each of a plurality of the sets of measurement data with regard to a pair of measurement points.

When generating and evaluating measurement data and determining the correlation, the procedure used can be e.g. as follows. In this instance, reference is made to FIG. 9.

E.g. the coordinate measuring instrument 1 represented in FIG. 1 is used in step S1 to measure a workpiece, so that coordinates are determined from a plurality of measurement points of the workpiece. In the next step S2, the measurement information obtained by measuring the measurement points of the workpiece is stored, in particular in the form of a set of measurement data. The measurement data record can also be generated not until later, however. A measurement data record is associated with the respective measured workpiece. As represented by a chain of arrows to step S1 from step S2 in FIG. 9, steps S1 and S2 are repeated for as many workpieces as there are workpieces needing to be measured. In particular, the workpieces can be produced in accordance with the same specified shape.

After all workpieces have been measured, a measure of the correlation is determined in step S3 for a pair of measurement points that are present in mutually corresponding fashion on all measured workpieces. The measure of the correlation is stored in the next step S4. As indicated by a chain of arrows leading from step S4 to step S3, steps S3 and S4 are also repeated until a measure of the correlation is determined for each of a plurality of pairs of measurement points and preferably for all pairs of measurement points, and is stored. In step S5, which follows step S4 as soon as all measures to be determined for the correlation have been determined, the method ends. Optionally, an evaluation of the determined measures of the correlation can be performed in step S5.

Figure 10:
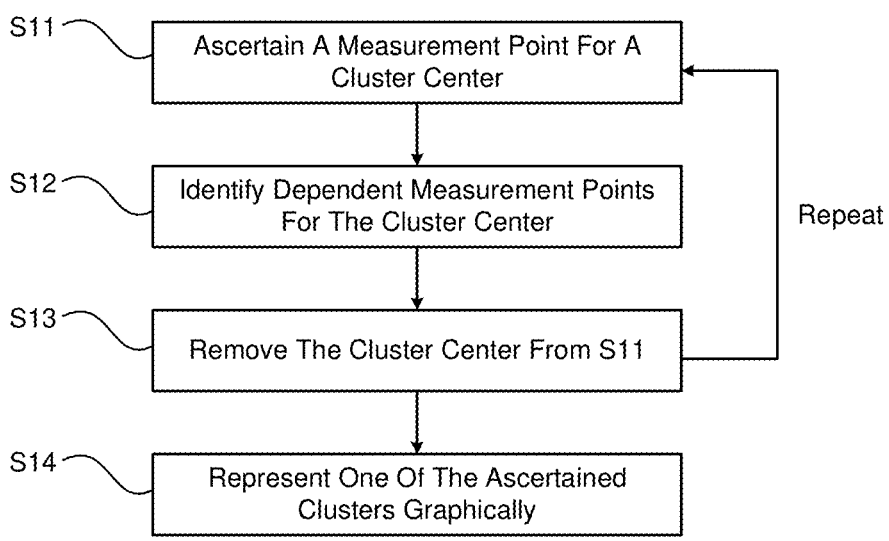
FIG. 10 is a flowchart showing steps in the evaluation of the determined measures of the correlation, wherein clusters of intercorrelated measurement points are formed.

Another example embodiment of an evaluation of the determined measures of the correlation is described on the basis of FIG. 10. First, however, the workpieces represented schematically in FIG. 2 to FIG. 4 will be discussed.

Figure 2:
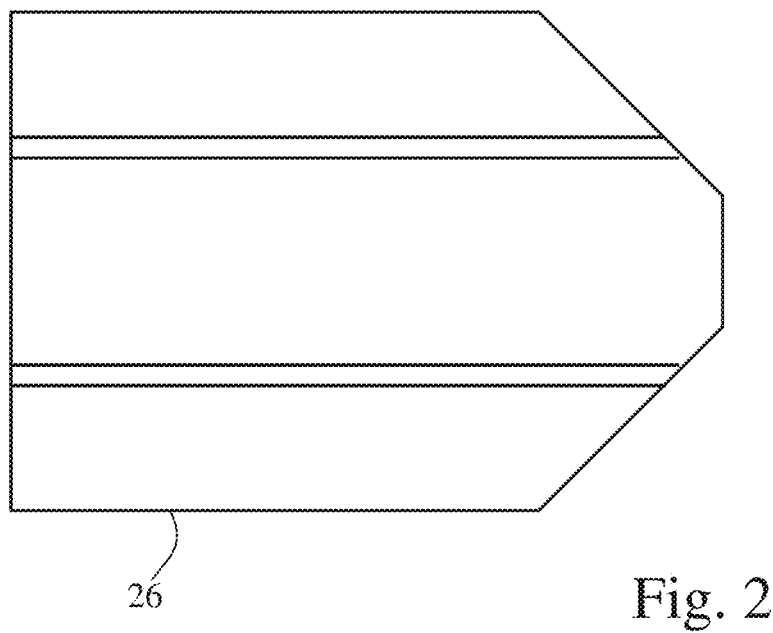
FIG. 2 is a plan view of an example of a workpiece.
Figure 3:
FIG. 3 is an end view of the workpiece represented in FIG. 2.

FIG. 2 shows a plan view of a workpiece whose front view is shown in FIG. 3. The represented workpiece 26 has a profile that breaks twice, as FIG. 3 shows. To manufacture the breaking profile, machining of a plate-shaped semifinished product took place, for example a deep-drawing process. E.g. a multiplicity of workpieces of the same type is manufactured in succession in one production process. Each of these workpieces can be measured e.g. By using an optical sensor, so that coordinates are ascertained for a multiplicity of surface points. E.g. in the case of the workpiece represented in FIG. 2 and FIG. 3, it is sufficient to determine the coordinates of these measurement points with regard to a coordinate axis that runs at right angles to the plane of the figure in FIG. 2 and that runs in a vertical direction in FIG. 3. Preferably, the coordinates are referenced to their respective specified coordinate, i.e. the difference between the measured coordinate and the specified coordinate is captured in the applicable measurement data record of the workpiece.

Figure 4:
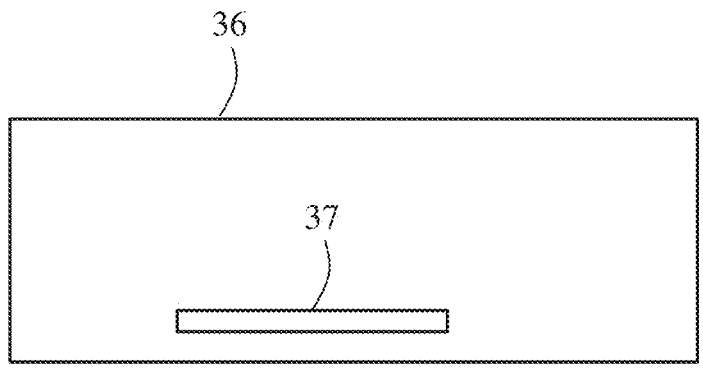
FIG. 4 is a plan view of another workpiece, which has a shape error.

A plan view of a workpiece 36 of different type is represented schematically in FIG. 4. A rectangular region 37 in FIG. 4 furthermore indicates that the workpiece 36 has a region in which there is systematically a divergence from its specified shape. Systematically means that this divergence is present in all or many manufactured copies of the workpiece.

Referring to FIG. 10, an example element of the method for evaluating the measures of the correlation that are determined for the workpieces will now be described. For the type of workpieces that is represented in FIG. 2 and FIG. 3, a multiplicity of measurement points has been measured in each case and a measure of the correlation over all measurement data records obtained has been determined for all pairs of measurement points. By way of example, the measure of the correlation has been determined as a Pearson correlation coefficient. Further, a threshold value is prescribed. All pairs of measurement points whose measure of the correlation is greater than or equal to the threshold value are regarded as highly correlated with one another and are interpreted as dependent on one another. The dependency allows conclusions about production.

In step S11 (FIG. 10), a measurement point is ascertained that is dependent on a large number of other measurement points or that is the measurement point that is dependent on the most other measurement points. This is accomplished by virtue of e.g. the number of measures of the correlation that are at least equal to the threshold value being determined for each measurement point in the applicable correlation matrix. Naturally, the threshold value can be prescribed to be higher or lower than the value 0.9. In order to determine a measurement point having a high number of dependencies, it is possible for e.g. a minimum number of other measurement points to be prescribed on which the respective measurement point is dependent. The ascertained measurement point having the high number of dependencies or having the highest number of dependencies is then regarded as a cluster center. In step S12, which follows step S11, the dependent measurement points are identified for the cluster center.

Alternatively, the dependent measurement points can be identified while the cluster center is ascertained. By way of example, ascertainment of the number of dependent measurement points can already involve logging or recording which dependent measurement points they are. By way of example, for each of the measurement points from the correlation matrix, a matrix associated with the measurement point or a row vector or column vector can be formed in which each other measurement point is provided with an entry concerning whether it is a dependent or non-dependent measurement point.

If all dependent measurement points are ascertained for a cluster center, i.e. if a cluster of measurement points having a cluster center has been ascertained, the procedure can be repeated. This is accomplished by removing the cluster center ascertained in step S11 from the set of fundamentally possible measurement points for the cluster center in step S13, which follows step S12. Optionally, the measurement points ascertained in step S12 that are dependent on the cluster center are also removed from the set of measurement points. Steps S11 and S12 are then repeated, or alternatively a step is used to already identify for each possible cluster center which dependent measurement points are involved.

When all clusters have been identified, it is then optionally possible to continue with step S14. In this case, the number of clusters to be identified can be limited to a maximum value or it is possible to require a cluster to have a minimum number of cluster points that are dependent on the cluster center.

In step S14, at least one of the ascertained clusters or the only ascertained cluster is represented graphically. In the example embodiment of FIG. 5, two clusters are represented graphically, specifically in a graphical representation of the workpiece 26 from FIG. 2 and FIG. 3. In the example embodiment, this is the plan view from FIG. 2, which is also jointly used to represent the clusters in FIG. 5. For each of the two represented clusters, it is possible to see the cluster center 27, 28 and the cluster points dependent on the respective cluster center 27, 28. In order to illustrate the relationship between the dependency and the cluster center 27, 28, the cluster center 27, 28 is connected to each of its dependent points via a straight line. All points are represented by small circles in FIG. 5.

Owing to this representation, an observer can immediately grasp the region of the surface of the workpiece in which measurement points dependent on the cluster center are located. The representations in FIG. 5 and also in FIG. 6 are simplified representations. The number of points per cluster is greatly reduced in practice in comparison with the preferred procedure, in order to render the individual cluster points discernible.

In practice, different colors can be used to represent the different clusters. It is then no longer necessary for each individual cluster point to be individually detected by the observer. On the basis of the connecting lines from the cluster centers to the dependent measurement points, the clusters are detected even when there is a very high number of measurement points. It is naturally possible for an observer to be able to alter the representation and e.g. to be able to hide the cluster points that do not satisfy a specific condition or do satisfy the condition. In this way, e.g. cluster points at a distance of less than a maximum distance or greater than a minimum distance from the cluster center can be represented or hidden.

Figure 5:
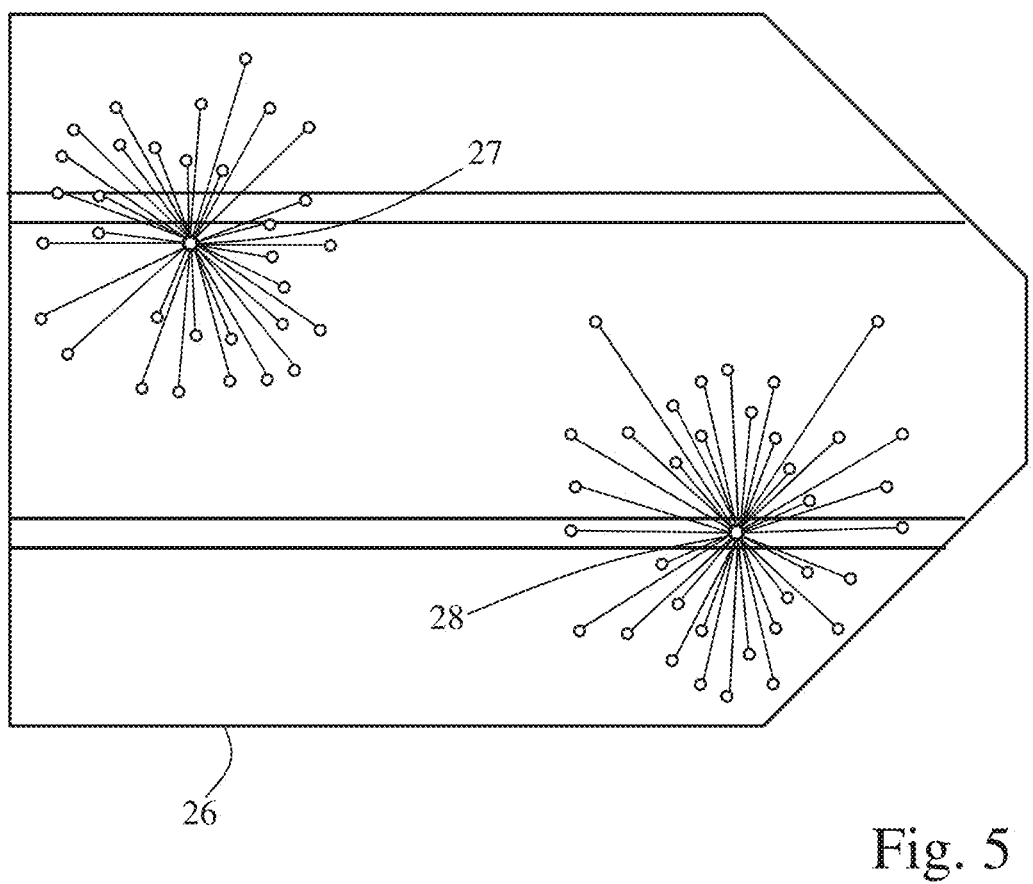
FIG. 5 is the plan view of the workpiece represented in FIG. 2 and FIG. 3, wherein additionally clusters of measurement points are represented.
Figure 6:
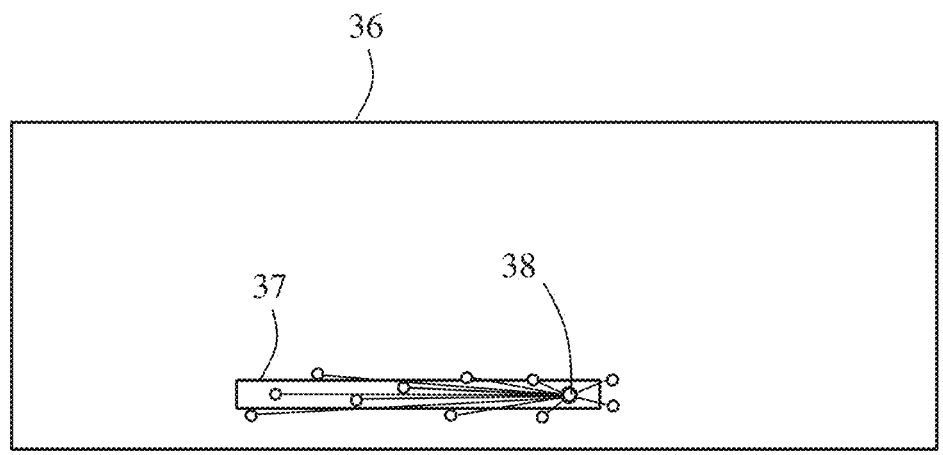
FIG. 6 is a plan view of the workpiece represented in FIG. 4, wherein a cluster of measurement points is additionally represented.

Returning to the workpiece 26 represented in FIG. 2, FIG. 3 and FIG. 5, the cluster centers 27, 28 are each in a region of the deformation that is attained by machining the semi-finished product. As corresponds to the represented clusters, the plurality of dependent measurement points of the respective cluster center 27, 28 is thus also arranged in the region of the deformation and close to the cluster center 27, 28. As a ready mentioned, this is a simplified representation. Further measurement points of the clusters even closer to that of the respective cluster center 27, 28 are not represented for the sake of discernibility of the measurement points.

Optionally, after step S13 or after step S14, a test schedule for measuring further workpieces of the same type can be created or changed. A test schedule generally has a plurality of measurement points and defines which measurement results are supposed to be obtained by measuring and evaluating a workpiece, such as e.g. distances between determined measurement points, diameter, roundness of cylindrical regions, etc. E.g. those measurement points from a cluster that are at a distance from the respective cluster center that is less than a prescribed minimum distance can be removed from the test schedule or not included in the test schedule. This is based on the idea that it can be expected that measurement points situated at a short distance from a cluster center will be dependent on the cluster center. If a workpiece has been deformed at the cluster center, this very often has repercussions on the surroundings around the cluster center. The selection or elimination of measurement points allows the performance of the test schedule to be shortened and/or the accuracy for the performance of the test schedule to be increased, e.g. if a coordinate measuring instrument having greater measurement accuracy makes use of the available measurement time.

A further possible procedure for the evaluation of the determined measures of the correlation involves cluster centers being handled in a special manner later during the performance of a test schedule for further workpieces, in contrast to the measurement points that are dependent thereon. This can start right when the measurement points are measured, by virtue of cluster centers being measured with greater accuracy than other measurement points. Alternatively or additionally, individual quality requirements can be based on cluster centers. E.g. it may be a requirement for workpieces at at least one cluster center to meet a prescribed accuracy requirement and/or for multiple workpieces of the same type at at least one cluster center to have coordinates that diverge from their mean value by no more than a prescribed measure of variance.

In FIG. 6, a representation that also contains a single cluster is chosen for the workpiece 36 represented in FIG. 4. The cluster center 38 of the cluster is in the region 37 that corresponds to the systematic divergence from the specified shape. Further, this is again an example embodiment in which the measurement information in the measurement data records is divergences between measured coordinates and specified coordinates.

All measurement points of the cluster that are dependent on the cluster center 38 are thus situated in the region 37. In practice, if the region 37 is not yet known, the local distribution of the measurement points of the cluster is conspicuous, since all measurement points are situated approximately inside an elongate rectangular region such as the region 37. The absence of cluster points in the representation of FIG. 6 above the represented cluster points indicates that this is a locally limited substantial specified shape divergence.

Figure 7:
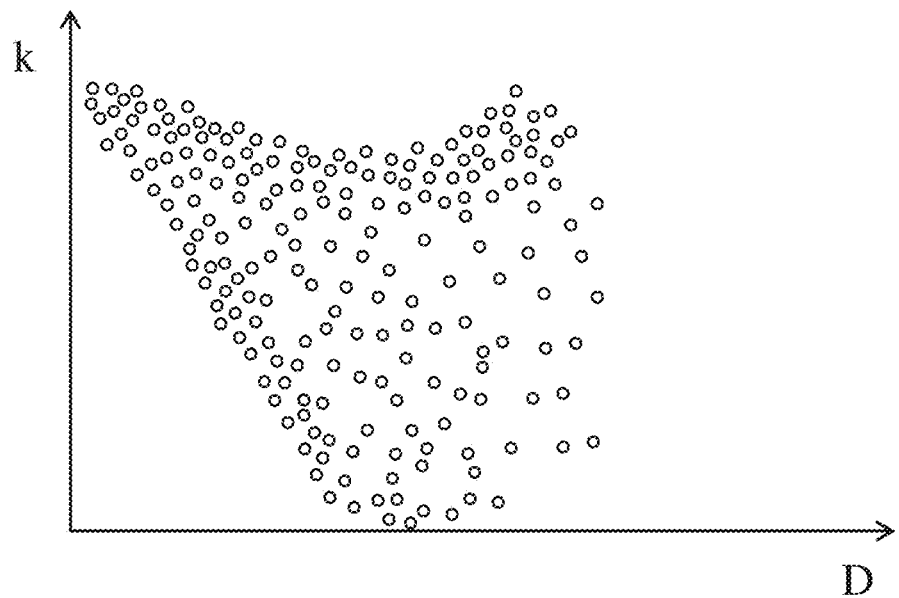
FIG. 7 is a graph with measures of a correlation between measurement points that are plotted as a function of the distance between the measurement points, specifically for the workpiece represented in FIG. 2, FIG. 3 and FIG. 5.
Figure 8:
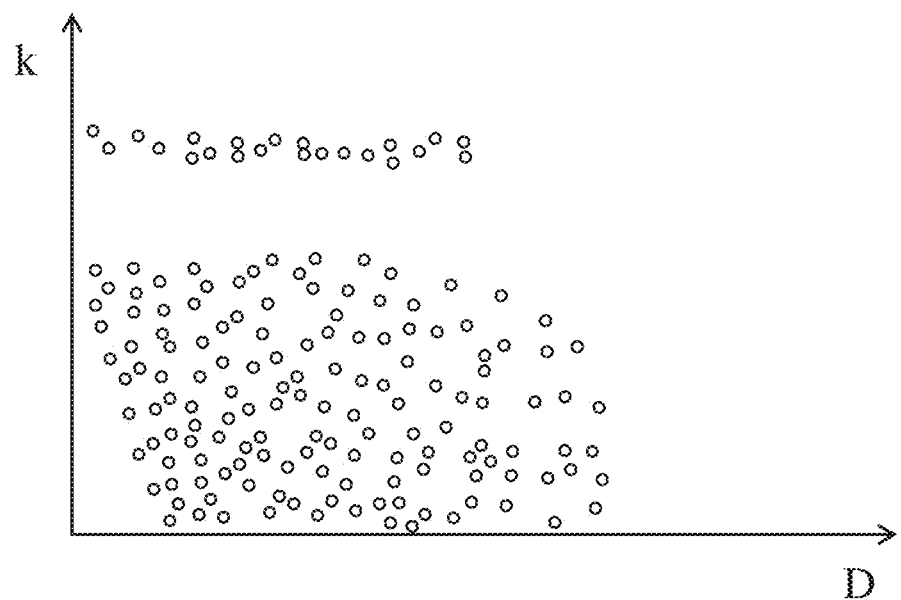
FIG. 8 is a graph with measures of a correlation between pairs of measurement points that are plotted as a function of the distance between the measurement points of the pairs, specifically for the workpiece represented in FIG. 4 and FIG. 6.

A type of the evaluation of the determined measures of the correlation that can be performed as alternative or in addition to the previously described evaluation will now be described on the basis of FIG. 7 and FIG. 8. In both representations, the measure k of the correlation for each of a multiplicity of measurement points is represented on the basis of the distance D of the respective measurement point from another measurement point, in particular for each combination of measurement points. FIG. 7 shows such an interrelation for the workpiece represented in FIG. 2, FIG. 3 and FIG. 5. FIG. 8 shows such an interrelation for the workpiece represented in FIG. 4 and FIG. 6.

In practice, it is preferred for the dependencies for very many more measurement points to be represented in accordance with those represented in FIG. 7 and FIG. 8. In order to make the effects clearly discernible, regions in the representations can in practice be represented using different colors on the basis of the density of the represented dependencies. This type of representation is similar to that of what is known as a heat map. It should be emphasized that the small circles represented in FIG. 7 and FIG. 8 do not represent measurement points, but rather the dependencies of the respective measure of the correlation on the distance between the measurement points of the pair under consideration. The more of such dependencies are represented in the graph per unit area, i.e. the more pairs of points have a similar, almost identical dependency, the greater is the density.

In the case represented in FIG. 7, which corresponds to the workpiece in FIG. 2, FIG. 3 and FIG. 5, it is striking that there are no entries in a triangular range having small values for the distance D and small values for the measure k of the correlation. This expresses the circumstance already mentioned above that points at a short distance typically have a high correlation with one another. Otherwise, it can be seen from FIG. 7 that there are two maxima for the correlation measure k, there being a high density there in each case. The density of the represented dependencies is furthermore high at the edge of the triangular range, in which there are no dependencies. The two maxima correspond to the structures of the workpiece with two elongate deformed regions. There is a dependency between points of the two different regions of the workpiece 26 that are deformed parallel to one another.

In the case of the workpiece 36 from FIG. 4 and FIG. 6, it is striking that there is a narrow range of dependencies for large correlation measures k over a continuous range of distances D between the pairs of points. Below this range, there is a range in which there are no dependencies. This is attributable to the fact already explained above that there is a systematic divergence from the specified shape in the local region 37 of the workpiece 36. The other dependencies in FIG. 8 are almost evenly distributed, there again being a triangular range without dependencies, for small distances D between the pairs of points and small values of the correlation measure k.

The dependency k(D) of the correlation measure k on the distance D between the pairs of points can be represented graphically in addition to at least one cluster, in particular at the same time, e.g. on different regions of the same screen or display or on screens or displays that are arranged next to one another. Further, the representation can be alterable for an observer such that the observer gets a highlighted representation of the associated measurement points in the cluster representation by selecting (e.g. by clicking with a computer mouse) a dependency k(D) in the representation. This facilitates comprehension of the interrelations of the two representations and also facilitates conclusions. If, e.g. in the representation of the dependencies k(D) in FIG. 8, a dependency in the upper range is selected, the corresponding points in the region 37 in FIG. 6 are highlighted. The observer can therefore easily see where in the workpiece the region having the high correlation is. In the highlighted representation, the cluster associated with the pair of points can also be highlighted, in particular. This is advantageous because generally more than one cluster is represented for the type of representations in accordance with FIG. 5 and FIG. 6.

In a situation other than that already described on the basis of the figures, the evaluation of the determined measures of the correlation makes it possible to ascertain whether or not there is an expected high correlation. E.g. when a series of workpieces are always created at the same distance from one another, the same type of machining takes place, such as e.g. welding on a pair of pins with the same distance between the pins. It is therefore expected that at this distance there are pairs of points having a high correlation with one another, in particular if the generated measurement data records of the workpieces immediately contain the measurement coordinates. Even if the measurement data records contain the divergences from the specified shape, however, a high correlation can be expected for the distance between the regions that are machined in the same manner. If the correlation for this distance is not particularly high or available only for very few measurement points, it is possible to draw the conclusion that the machining process has not been performed as expected.

The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc). The phrase at least one of A, B, and C should be construed to mean a logical (A OR B OR C), using a non-exclusive logical OR, and should not be construed to mean "at least one of A, at least one of B, and at least one of C."

What is claimed is:

1. A method for evaluating measurement data from a measurement of a plurality of workpieces, the method comprising:
for each workpiece of the plurality of workpieces, obtaining a set of measurement data characterizing a plurality of measurement points for measuring the workpiece, wherein for each measurement point, the set of measurement data includes at least one of:
a measured coordinate and a divergence from a comparison coordinate;
determining, for each pair of measurement points of a plurality of pairs of measurement points, a measure of the correlation of the measured coordinates and/or of the divergences using measurement data from a plurality of the sets of measurement data; and
generating a cluster of measurement points by:
ascertaining a first measurement point for the cluster; and
determining additional measurement points that form a respective pair of measurement points with the first measurement point, wherein the respective pair includes a respective measure of the correlation that satisfies an inclusion condition for inclusion of each additional measurement point into the cluster.

2. The method of claim 1, wherein at least one subregion of the plurality of workpieces has the same specified shape across the plurality of workpieces.

3. The method of claim 1, wherein the measure of the correlation includes a correlation coefficient.

4. The method of claim 1, wherein:
the cluster is represented graphically and
connecting lines from a plurality of the additional measurement points of the cluster to the first measurement point are represented together with a representation or partial representation of one of the workpieces or of a specified shape of the workpieces.

5. The method of claim 1, wherein:
the cluster is represented graphically;
a contour line is produced around all cluster points of the cluster; and
a region inside the contour line is represented in a color associated with the cluster.

6. The method of claim 1, wherein a test schedule that has measurement points to be measured for the measurement of additional workpieces is created or altered taking into consideration the determined measures of the correlation.

7. The method of claim 1, further comprising ascertaining, for each pair of measurement points of the plurality of pairs of measurement points, a distance of the measurement points of the pair from one another.

8. The method of claim 7, wherein the determined measure of the correlation is represented graphically for the plurality of pairs of measurement points on the basis of the ascertained distance between the measurement points of the pair.

9. The method of claim 1, wherein the obtaining includes performing measurements of the plurality of workpieces to generate the set of measurement data.

10. The method of claim 1, wherein the obtaining includes retrieving the set of measurement data from storage.

11. An apparatus for evaluating measurement data from a measurement of a plurality of workpieces, the apparatus comprising:
at least one data processing computer, wherein:
each workpiece has an associated set of measurement data characterizing a plurality of measurement points for measuring the workpiece, wherein for each measurement point, the set of measurement data includes at least one of:
a measured coordinate and a divergence from a comparison coordinate; and
the at least one data processing computer is configured to:
determine, for each pair of measurement points of a plurality of pairs of measurement points, a measure of the correlation of the measured coordinates and/or of the divergences using measurement data from a plurality of the sets of measurement data; and
generate a cluster of measurement points by:
ascertaining a first measurement point for the cluster; and
determining additional measurement points that form a respective pair of measurement points with the first measurement point, wherein the respective pair includes a respective measure of the correlation that satisfies an inclusion condition for inclusion of each additional measurement point into the cluster.

12. A non-transitory computer-readable medium storing processor-executable instructions, the instructions comprising:
for each workpiece of a plurality of workpieces, obtaining a set of measurement data characterizing a plurality of measurement points for measuring the workpiece, wherein for each measurement point, the set of measurement data includes at least one of:
a measured coordinate and a divergence from a comparison coordinate;
determining, for each pair of measurement points of a plurality of pairs of measurement points, a measure of the correlation of the measured coordinates and/or of the divergences using measurement data from for a plurality of the sets of measurement data; and
generating a cluster of measurement points by:
ascertaining a first measurement point for the cluster; and
determining additional measurement points that form a respective pair of measurement points with the first measurement point, wherein the respective pair includes a respective measure of the correlation that satisfies an inclusion condition for inclusion of each additional measurement point into the cluster.

13. The computer-readable medium of claim 12, wherein the obtaining includes performing measurements of the plurality of workpieces to generate the set of measurement data.

14. The computer-readable medium of claim 12, wherein the obtaining includes retrieving the set of measurement data from storage.

\* \* \* \* \*